(12) United States Patent
Dow et al.

(10) Patent No.: US 9,495,399 B1
(45) Date of Patent: Nov. 15, 2016

(54) AUGMENTED REALITY MODEL COMPARISON AND DEVIATION DETECTION

(71) Applicant: International Business Machines Corporation, Armonk, NY (US)

(72) Inventors: Eli M. Dow, Wappingers Falls, NY (US); Erin M. Farr, Fishkill, NY (US); Michael E. Gildein, II, Wappingers Falls, NY (US); Moses J. Vaughan, Mahwah, NJ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/950,152

(22) Filed: Nov. 24, 2015

(51) Int. Cl.
*G06F 7/00* (2006.01)
*G06F 17/30* (2006.01)
*G06K 9/46* (2006.01)

(52) U.S. Cl.
CPC ... *G06F 17/30321* (2013.01); *G06F 17/30256* (2013.01); *G06F 17/30864* (2013.01); *G06K 9/46* (2013.01)

(58) Field of Classification Search
CPC .................. G06F 17/30321; G06F 17/30864
USPC ....................................................... 707/741
See application file for complete search history.

(56) References Cited

U.S. PATENT DOCUMENTS

| | | | |
|---|---|---|---|
| 5,583,933 A * | 12/1996 | Mark | G06Q 20/341 235/380 |
| 8,315,425 B2 | 11/2012 | Appel et al. | |
| 8,443,301 B1 | 5/2013 | Easterly et al. | |

(Continued)

OTHER PUBLICATIONS

Eli M. Dow et al., Pending U.S. Appl. No. 15/253,944 entitled "Augmented Reality Model Comparison and Deviation Detection," filed with the U.S. Patent and Trademark Office on Sep. 1, 2016.

(Continued)

*Primary Examiner* — Kimberly Wilson
(74) *Attorney, Agent, or Firm* — Cantor Colburn LLP; Steven Chiu

(57) ABSTRACT

An aspect of providing augmented reality model comparison and deviation detection includes receiving a three-dimensional (3D) model of an object that is associated with a domain, determining a set of characteristics of the object from the 3D model, and searching a domain-specific database for data matching the set of characteristics. The domain-specific database corresponds to the domain associated with the object. An aspect also includes determining an identification of the object from data in the domain-specific database that matches the set of characteristics. For each characteristic in the set of characteristics, and aspect further includes comparing each value of the characteristic to a corresponding value in the matching data of the domain-specific database, and calculating any variation between the corresponding value of the characteristic and the value of the matching data. Another aspect includes creating a searchable index of the matching data and corresponding variations.

17 Claims, 3 Drawing Sheets

(56) References Cited

U.S. PATENT DOCUMENTS

| | | | |
|---|---|---|---|
| 8,731,892 B2* | 5/2014 | Al-Shammari | G06F 17/5009 703/10 |
| 8,803,992 B2 | 8/2014 | Shingu et al. | |
| 8,965,741 B2 | 2/2015 | McCulloch et al. | |
| 2002/0128985 A1 | 9/2002 | Greenwald | |
| 2009/0033744 A1 | 2/2009 | Frantz | |
| 2012/0330447 A1* | 12/2012 | Gerlach | G01B 11/24 700/95 |
| 2013/0063487 A1 | 3/2013 | Spiegel et al. | |
| 2014/0146038 A1 | 5/2014 | Kangas et al. | |
| 2014/0293016 A1 | 10/2014 | Benhimane et al. | |
| 2016/0070581 A1* | 3/2016 | Soon-Shiong | G06Q 50/10 715/706 |

OTHER PUBLICATIONS

List of IBM Patents or Patent Applictions Treated As Related; (Appendix P), Filed Sep. 8, 2016, 2 pages.

* cited by examiner

AUGMENTED REALITY MODEL COMPARISON AND DEVIATION DETECTION

BACKGROUND

The invention relates generally to data processing, and more specifically, to augmented reality model comparison and deviation detection.

Augmented reality solutions enable a view of physical world objects that are supplemented or augmented with computer-generated sensory input. The augmented features provide an enhancement to a user's current view or perception of the object and/or the object's environment. Information generated via the sensory input can be overlaid on a digital view of the object via a computer display.

SUMMARY

According to an embodiment a method, system, and computer program product for augmented reality model comparison. A method includes receiving a three-dimensional (3D) model of an object that is associated with a domain, determining, by a computer processor, a set of characteristics of the object from the 3D model, and searching a domain-specific database for data matching the set of characteristics. The domain-specific database corresponds to the domain associated with the object. The method also includes determining an identification of the object from data in the domain-specific database that matches the set of characteristics. For each characteristic in the set of characteristics, the method includes comparing each value of the characteristic to a corresponding value in the matching data of the domain-specific database, and calculating any variation between the corresponding value of the characteristic and the value of the matching data. The method further includes creating, by the computer processor, a searchable index of the matching data and corresponding variations.

Additional features and advantages are realized through the techniques of the invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings, which:

DETAILED DESCRIPTION

Exemplary embodiments provide augmented reality model comparison and deviation detection. The augmented reality model comparison and deviation detection enables object identification of a three-dimensional (3D) image through augmented reality techniques and domain-specific database analyses. The augmented reality model comparison and deviation detection compares characteristics and corresponding values of a model of the 3D image with baseline data, such as a domain-specific database, and calculates any variations or deviations among the data. The augmented reality model comparison and deviation detection provides a search index of the characteristics and variations that allows a user to search specific characteristics for corresponding variations. In addition, the augmented reality model comparison and deviation detection links object data to external data sources, such that a user can search the data sources for additional information about the variation, such as any effects on the monetary value of the object caused by the variation and/or whether any regulations associated with the variation indicate the variation reflects a non-compliance of the regulations.

Figure 1:
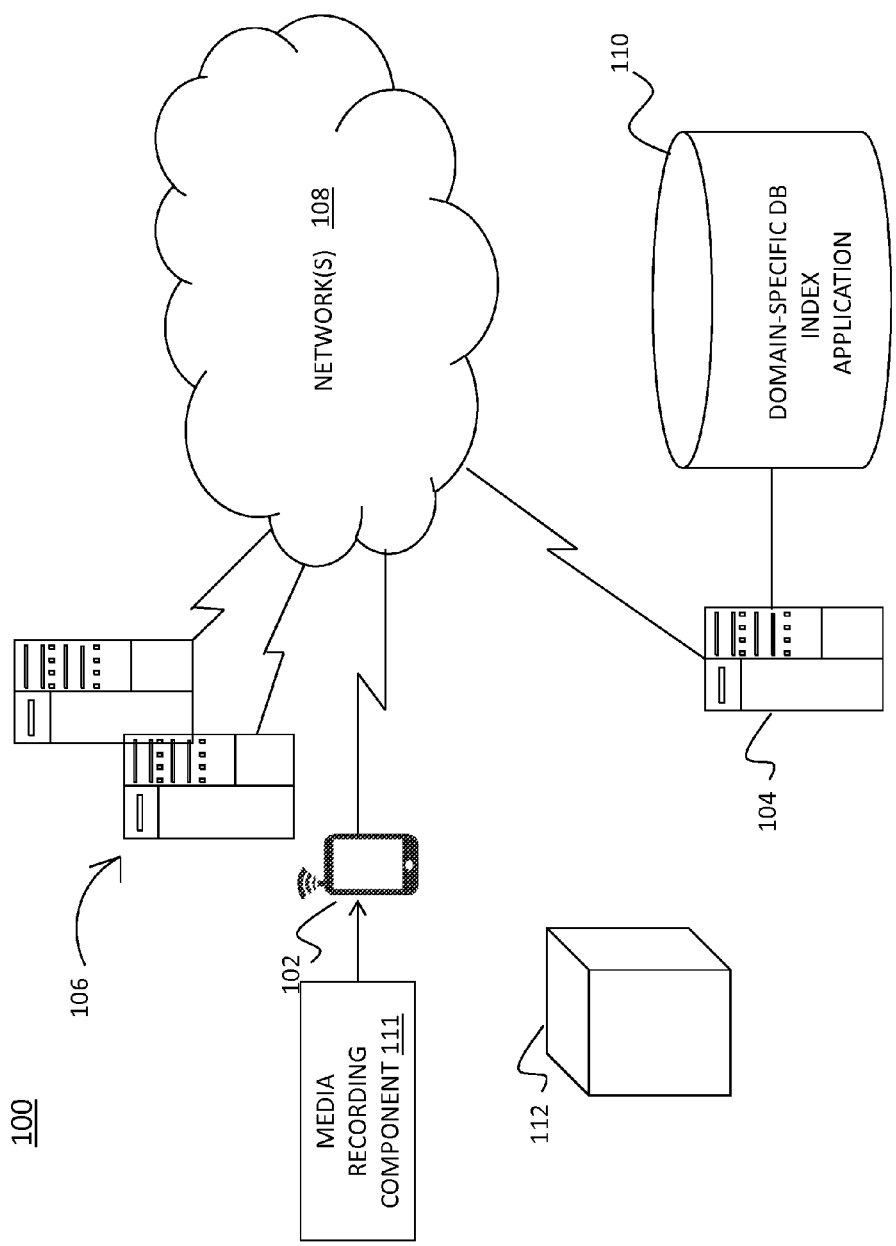
FIG. 1 depicts a system upon which augmented reality model comparison and deviation detection services may be implemented in accordance with an embodiment of the invention.

Turning now to FIG. 1, a system 100 upon which the augmented reality model comparison and deviation detection may be implemented will now be described in an embodiment. The system 100 includes a client device 102, host system computer 104, and data sources 106, each of which is communicatively coupled to one or more networks 108.

The client device 102 may be a portable, wireless communication device, e.g., smart phone, personal digital assistant, or computer tablet. The client device 102 includes a media recording component 111, such as a camera. In addition, the client device 102 may include augmented reality capabilities, which augments images captured by the camera with computer-generated sensory inputs (e.g., through components such as GPS, accelerometers, MEMS, optical sensors, and gyroscopes, to name a few). In an embodiment, the client device 102 may include a wearable device, such as a head-mounted unit or eyewear with heads up display features. The client device 102 is network-enabled through one or more network agents, such as a wireless network adapter and transceiver, and may include short-range wireless communications, e.g., BLUETOOTH or WI-FI, as well as long-range communication capabilities via one or more networks 108. In an embodiment, the client device 102 may include a scanner component that scans smaller objects that are placed on a display of the device 102. For example, collectable items, such as stamps and coins can be placed directly on the device's display and scanned for creating a model of the item. For large objects, such as buildings, the client device 102 may be equipped with a laser range finder The host system computer 104 may be implemented as a high-speed computer processing device for handling the volume of activities associated with users of the augmented reality model comparison and deviation detection. In an embodiment, the host system computer 102 may be operated by an entity, such as an enterprise or organization. The entity may provide services associated with the augmented reality model comparison and deviation detection.

The data sources 106 may be each associated with an independent, third-party entity that receives requests via the host system computer 104 and/or the client system 102 for information. Each of the data sources 106 may be implemented as one or more computer processors and associated memory devices. In an embodiment, a data source 106 may be an automobile valuation service enterprise. Another data source 106 may be a consumer product valuation service enterprise. A further data source 106 may be a governmental agency that stores various regulations, codes, and/or inspection data. The data sources 106 receive queries for information regarding an object and provide, based on the content in the queries, valuation, compliance, or other data in response.

As shown in FIG. 1, a storage device 110 is communicatively coupled to the host system computer 104. The storage device 104 may be implemented using a variety of devices for storing electronic information. It is understood that the storage device 110 may be implemented using memory contained in the host system computer 104 or it may be a separate physical device, as illustrated in FIG. 1. The storage device 110 may be logically addressable as a consolidated data source across a distributed environment that includes one or more networks, such as networks 108. Information stored in the storage device 110 is retrieved and manipulated via the host system computer 104, and/or client device 102.

The storage device 110 houses applications associated with the entity (e.g., enterprise applications), as well as domain-specific data in one or more databases. The domain-specific data pertains to a particular knowledge domain corresponding to a particular class or subject matter. For example, if the subject of the domain pertains to a class of vehicles associated with a vehicle manufacturer, then the domain-specific data may include vehicle specification data for components of each of the vehicle models manufactured by the vehicle manufacturer.

In an embodiment, the host system computer 104 executes an application for implementing the augmented reality model comparison and deviation detection described herein. For example, the host system 104 may execute an application stored in storage device 110, as shown in FIG. 1. In an alternative embodiment, at least a portion of the augmented reality model comparison and deviation detection may be implemented directly between the client device 102 and the data sources 106, e.g., where the client device 102 executes the application in lieu of, or in cooperation with, the host system computer 104. In an embodiment, the client device 102 may directly access the storage device 110 to search domain-specific data. In a further embodiment, the domain-specific database may be implemented by an independent entity, whereby the host system computer 104 provides the augmented reality model comparison and deviation detection for end users and communicatively couples to the domain-specific database based on permissions or an agreement with the independent entity.

Networks 108 may include a combination of one or more different types of networks (e.g., local area network, wide area network, Internet, satellite, or terrestrial network, to name a few).

Also shown in FIG. 1 is an object 112. For purposes of illustration, the object 112 represents an item that a user is interested in obtaining information for via the augmented reality model comparison and deviation detection. In an embodiment, the client device 102 captures a three-dimensional (3D) image of the object, which can be implemented, e.g., by circling the object 112 while recording it with the client device's media recording component 111. A 3D model is then generated, e.g., using augmented reality techniques. In an embodiment, the client device 102 may implement a tool for generating the 3D model. Alternatively, the client device 102 may upload the 3D image and associated data to the host system computer 104, and the host system computer 104 generates the 3D model. Data produced from the augmented reality technique may include various characteristics of the 3D image, such as dimensions and color, to name a few. Each of the characteristics includes an associated value. For example, the dimensions of the object 112 may include values of width, depth, and height.

Figure 2:
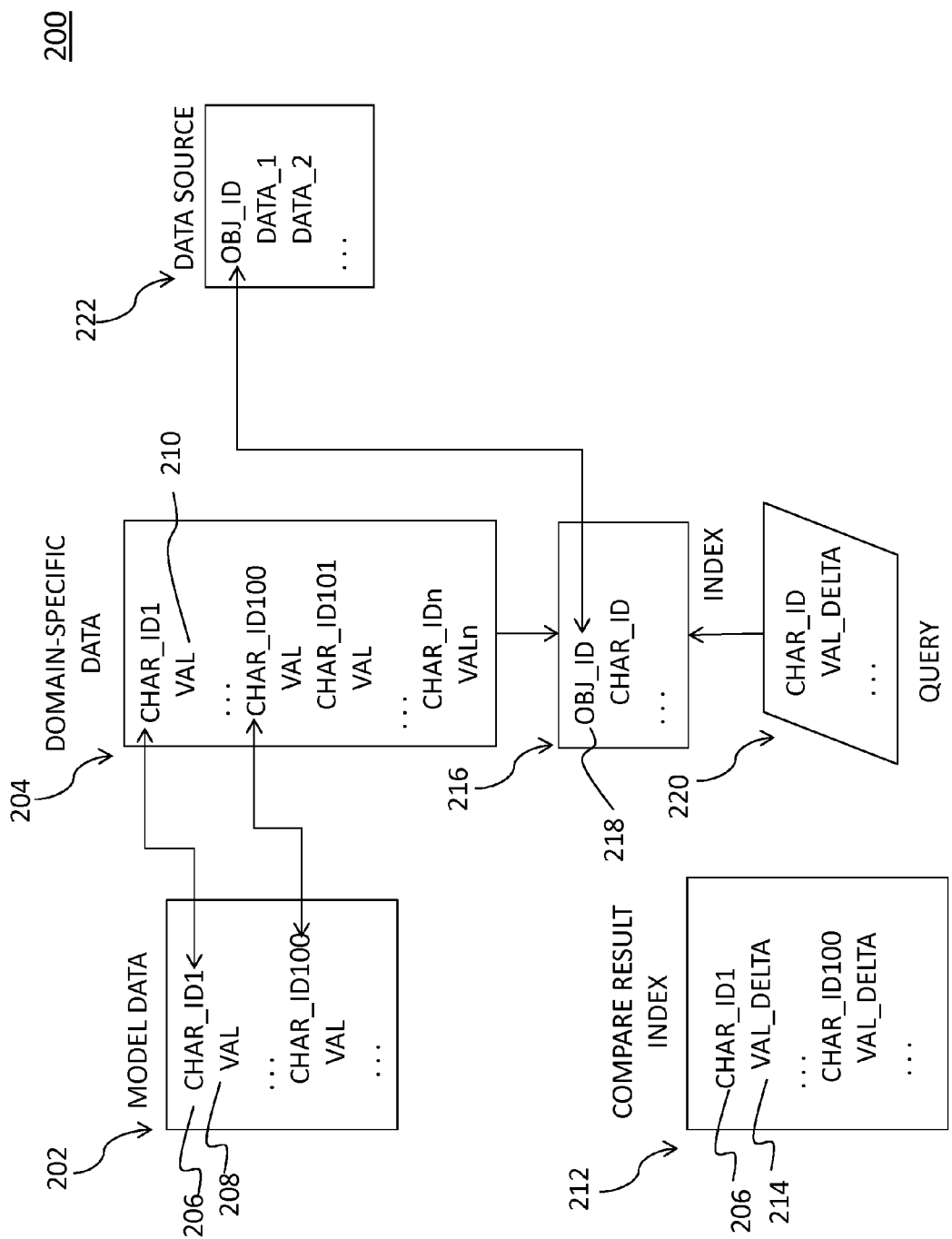
FIG. 2 depicts data structures configured for facilitating augmented reality model comparison and deviation detection in accordance with an embodiment of the invention.

In an embodiment, for any particular domain, the characteristics and values of the 3D model can be compared to characteristics and values of data stored in the domain-specific database to determine an identification of the object. The comparisons can also include comparing the values of corresponding characteristics and matching data from the domain-specific database in order to identify any variations between the characteristics of the object 112 and the characteristics of, e.g., specification data describing original specifications of the object from a manufacturer. The object identification can be used to generate an index that is linked to a corresponding one or more of the data sources 106, as will be described further herein. In this manner, queries can be generated for the characteristics and variations of the object against one or more resources provided by a data source 106. The search and comparison features can be implemented with respect to the domain-specific database and data sources via database structures provided by the augmented reality model comparison and deviation detection. The database structures 200 described in FIG. 2 are provided as non-limiting examples of how the 3D model characteristics, domain-specific databases, and data sources can be implemented. It will be understood that variations of the database structures 200 can be applied in order to realize the advantages of the embodiments.

Turning now to FIG. 2, database structures 200 for augmented reality model comparison and deviation detection will now be described. A structure 202 stores characteristics and values from the 3D model generated for an object. As shown in structure 202, identifiers of characteristics 206 are stored and numbered (e.g., CHAR_ID1), along with a value 208 (VAL) for the characteristic identifier. A structure 204 stores characteristics and values for all elements belonging to the domain. As shown in structure 204, a numbered characteristic identifier (CHAR_ID1) and corresponding value (VAL) 210 is configured for each element. In an embodiment, the value 210 represents the originally defined value for the characteristic.

A structure 212 stores characteristic identifiers (e.g., CHAR_ID1) and delta values (e.g., VAL-DELTA) 214 for each characteristic in which a corresponding matching characteristic was found in the domain-specific database. The delta value 214 reflects a quantified difference between the value in the domain-specific database structure 204 and the value in the 3D model structure 202 with respect to a common characteristic. Thus, e.g., the delta value of CHAR_ID1 206 is the difference between the value 210 and the value 208.

A structure 216 stores an object identifier (OBJ_ID) 218 for a set of characteristics in the domain-specific database that are attributed to an object. The data structure 216 enables the application to generate an index from the characteristics that correspond to the object and which are used to link the domain-specific database to a data source.

A query 220 includes a user-selected characteristic identifier and associated delta value, which can be used, along with the object identifier, to search for information from the data source. Correspondingly, a structure 222 stores object identifiers and one or more data fields that provide a format for corresponding data stored in the data source 106. These features will be described further herein.

Figure 3:
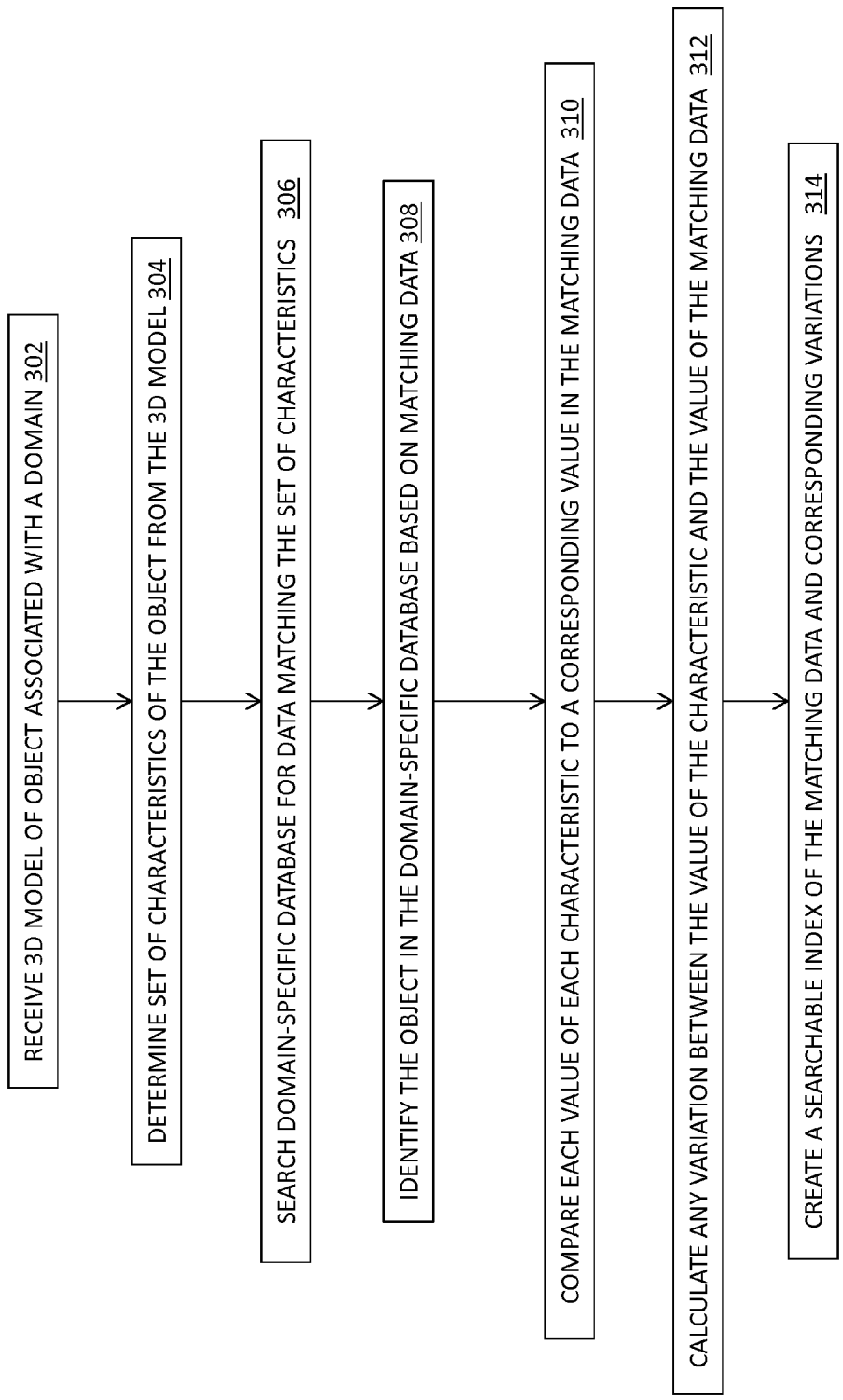
FIG. 3 depicts a flow diagram of a high-level process for implementing augmented reality model comparison and deviation detection services in accordance with an embodiment of the invention.

Turning now to FIG. 3, a flow diagram describing a process for implementing augmented reality model comparison and deviation detection will now be described in an embodiment.

In block 302, the application receives a 3D model of an object associated with a particular domain (e.g., through structure 202). In block 304, the application determines a set characteristics and associated values of the object from the 3D model. The set of characteristics may include, e.g., object dimensions, colors, and/or conditioning. The values may include one or more of size, shape, proportion, and gradient.

In block 306, the application searches a domain-specific database for data matching the set of characteristics. The domain-specific database corresponds to the domain associated with the object and may be implemented through structure 204. In one embodiment, the domain-specific database is a product specification database, and the object subject to capturing is created by a manufacturer.

In block 308, the application determines an identification of the object from data in the domain-specific database that matches the set of characteristics. In an embodiment, the identification may be implemented using image detection techniques.

In block 310, for each characteristic in the set of characteristics, the application compares each value of the characteristic to a corresponding value in the matching data of the domain-specific database, and calculates any variation between the corresponding value of the characteristic and the value of the matching data in block 312.

In block 314, the application creates a searchable index of the matching data and corresponding variations. The index can be implemented through structure 212. A user, e.g., a user of the client device 102 may generate a query for a particular characteristic of interest and its corresponding delta value is returned (e.g., through the index configured from structure 212). Thus, a user can immediately ascertain differences between the object captured by the device 102 and the object in its original form. The search may be implemented by a user by inputting one or more characteristics of interest from the set of characteristics, and the index returns corresponding one or more variations attributable to the characteristic(s). For example, suppose a characteristic is a color and its value indicates a qualitative aspect of the color, such as hue, shade, or other spectral property. Using spectral analysis or other color analysis techniques, the value of the characteristic can be compared to source data that indicates an original or standard value (e.g., an original manufacturer's specification). A delta value is calculated, if a variation exists, between the value of the object's characteristic and the original or standard known value. While color is described herein as a searchable characteristic in the index, it will be understood that many other characteristics or facets of an object can be provided in the index.

In addition to ascertaining the differences between object models captured by the device and a corresponding representation of the object in its original form, the user may also obtain information relating to how the deviation or variation affects the object's value, safety, and/or compliance to some regulation. In an embodiment, the augmented reality model comparison and deviation detection generates a query about the object including one or more characteristics of interest. Using an example of value, suppose the user seeks to determine a monetary value corresponding to a variation identified from results of a search of the index (e.g., from structure 212). A query (e.g., query 220) is submitted to a data source that includes an indication of the variation and the corresponding characteristic, as well as an identifier of the object. The application maps the character identifier to its corresponding object identifier through structure 218, which object identifier may be derived from the search of the domain-specific database. Through the structure 216, the domain-specific database is linked to the data source.

The monetary value may reflect an increase in value of the object or a decrease in value of the object based on the nature, type, and/or degree of the variation. The monetary value may be the adjusted or modified value of the object based on the variation, or may be an amount of reduction or increase in the value of the object attributable to the variation.

In another example, where the object captured is a building structure, the request may include a request for compliance data corresponding to a variation responsive to a search of the searchable index. The search may be implemented by a user by inputting one or more characteristics of interest from the set of characteristics, and the index returns corresponding one or more variations attributable to the characteristic(s). The variations reflect a delta value between the queried characteristic's value and a value of a corresponding matching data element from the domain-specific database. A query is submitted to a data source that includes an indication of the variation and a corresponding characteristic, as well as an identifier of the object. The domain-specific database is linked to the data source through an index of domain-specific data, the data source storing building regulation codes. The compliance data includes an indicator of compliance of the variation based on the building regulation codes.

As indicated above, different types of objects can be captured through the client device 102, and different characteristics, values, and delta values can be ascertained via the augmented reality model comparison and deviation detection. For example, cars, collectible items, building structures, currency, identification cards, or any physical good can be captured, modeled, and processed using the techniques described herein.

In measuring the size of a small object (e.g., a coin, stamp, collector card, etc.), if the surface area of one facet of the object is known, a representation of the surface area can be placed on the display (e.g., a display of client device 102) should the surface area be smaller than the device display). If the object surface area is larger than the surface area of the physical object, then alternative means of object measurement may be required. In instances such as measuring the footprint of a structure such as house, the incorporation of a laser range finder into the device may be advantageous. Alternatively, using images of the object with another known size object in the foreground can be used to compute the larger distances, e.g., using geometric means.

To measure colors, the use of advanced colorimeter sensors, spectrophotometers, or more simple camera-based based techniques (e.g., a standard color application) can be used.

For collectible objects, the model of the object can be used to compare against known areas of value for its domain including conditioning, popularity, and scarcity. Conditioning can be obtained via a model analysis of imperfections (e.g., centering, corners, edges, yellowing, gloss, scuffing, dents, and depressions), whereas popularity and scarcity information may be readily available in domain specific databases.

In some instances, models may be provided by manufacturers or stored as public records, e.g., in the case of buildings.

The augmented reality model comparison and deviation detection can be analyzed for a number of queries to answer questions such as: whether damaged parts exist and an effect on the value of the object; whether any parts of the object differ from the original object and any effect these differences have on the value in terms of appreciation or depreciation; whether there exist any mismatches of color between the object and the original item; whether any recalls have been issued for the item based on the object identification; and whether there exist any violations against regulations.

In addition, any information about the user of the client device 102 can be applied in determining answers to queries. For example, knowing the user's location can be useful to determine a demand for the object in terms of assessing its valuation.

Technical effects and benefits include augmented reality model comparison and deviation detection. The augmented reality model comparison and deviation detection enables object identification of a three-dimensional (3D) image through augmented reality techniques and domain-specific database analyses. The augmented reality model comparison and deviation detection compares characteristics and corresponding values of a model of the 3D image with baseline data, such as a domain-specific database, and calculates any variations or deviations among the data. The augmented reality model comparison and deviation detection provides a search index of the characteristics and variations that allows a user to search specific characteristics for corresponding variations. In addition, the augmented reality model comparison and deviation detection links object data to external data sources, such that a user can search the data sources for additional information about the variation, such as any effects on the monetary value of the object caused by the variation and/or whether any regulations associated with the variation indicate the variation reflects a non-compliance of the regulations.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   receiving a three-dimensional (3D) model of an object, the object associated with a domain;
   determining, by a computer processor, a set of characteristics of the object from the 3D model;
   searching a domain-specific database for data matching the set of characteristics, the domain-specific database corresponding to the domain associated with the object;
   determining an identification of the object from data in the domain-specific database that matches the set of characteristics;
   for each characteristic in the set of characteristics:
      comparing each value of the characteristic to a corresponding value in the matching data of the domain-specific database; and
      calculating any variation between the corresponding value of the characteristic and the value of the matching data;
   creating, by the computer processor, a searchable index of the matching data and corresponding variations;
   receiving a request for a monetary value corresponding to a variation responsive to a search of the searchable index, the search including a characteristic from the set of characteristics and corresponding variation; and
   submitting a query to a data source, the query including the characteristics and the corresponding variation, wherein the domain-specific database is linked to the data source through an index of domain-specific data and an identifier of the object;
   wherein the monetary value reflects one of an increase in value of the object and a decrease in value of the object based on a type and degree of the variation.

2. The method of claim 1, wherein the domain-specific database is a product specification database, and the object is a product created by a manufacturer.

3. The method of claim 1, wherein the identification of the object is determined using an image detection technique.

4. The method of claim 1, wherein the object is a building structure, the method further comprising:
   receiving a request for compliance data corresponding to a variation responsive to a search of the searchable index, the search including a characteristic from the set of characteristic and corresponding variation; and
   submitting a query to a data source, the query including the characteristic and the corresponding variation, wherein the domain-specific database is linked to the data source through an index of domain-specific data and an identifier of the object, the data source storing building regulation codes;
   wherein the compliance data includes an indicator of compliance of the variation based on the building regulation codes.

5. The method of claim 1, wherein the set of characteristics includes at least one of dimensions, colors, and conditioning.

6. The method of claim 1, wherein the values include at least one of size, shape, proportion, and gradient.

7. A system, comprising:
   a memory having computer readable instructions; and
   a processor for executing the computer readable instructions, the computer readable instructions including:
   receiving a three-dimensional (3D) model of an object, the object associated with a domain;
   determining a set of characteristics of the object from the 3D model;
   searching a domain-specific database for data matching the set of characteristics, the domain-specific database corresponding to the domain associated with the object;
   determining an identification of the object from data in the domain-specific database that matches the set of characteristics;
   for each characteristic in the set of characteristics:
      comparing each value of the characteristic to a corresponding value in the matching data of the domain-specific database; and
      calculating any variation between the corresponding value of the characteristic and the value of the matching data;
   creating a searchable index of the matching data and corresponding variations;
   receiving a request for a monetary value corresponding to a variation responsive to a search of the searchable index, the search including a characteristic from the set of characteristics and corresponding variation; and
   submitting a query to a data source, the query including the characteristics and the corresponding variation, wherein the domain-specific database is linked to the data source through an index of domain-specific data and an identifier of the object;
   wherein the monetary value reflects one of an increase in value of the object and a decrease in value of the object based on a type and degree of the variation.

8. The system of claim 7, wherein the domain-specific database is a product specification database, and the object is a product created by a manufacturer.

9. The system of claim 7, wherein the identification of the object is determined using an image detection technique.

10. The system of claim 7, wherein the object is a building structure, the computer readable instructions further comprise:
   receiving a request for compliance data corresponding to a variation responsive to a search of the searchable index, the search including a characteristic from the set of characteristic and corresponding variation; and
   submitting a query to a data source, the query including the characteristic and the corresponding variation, wherein the domain-specific database is linked to the data source through an index of domain-specific data and an identifier of the object, the data source storing building regulation codes;
   wherein the compliance data includes an indicator of compliance of the variation based on the building regulation codes.

11. The system of claim 7, wherein the set of characteristics includes at least one of dimensions, colors, and conditioning.

12. The system of claim 7, wherein the values include at least one of size, shape, proportion, and gradient.

13. A computer program product comprising a computer readable storage medium having program instructions embodied therewith, wherein the computer readable storage medium is not a transitory signal per se, the program instructions executable by a computer processor to cause the computer processor to perform a method comprising:
   receiving a three-dimensional (3D) model of an object, the object associated with a domain;
   determining a set of characteristics of the object from the 3D model;
   searching a domain-specific database for data matching the set of characteristics, the domain-specific database corresponding to the domain associated with the object;
   determining an identification of the object from data in the domain-specific database that matches the set of characteristics;
   for each characteristic in the set of characteristics:
      comparing each value of the characteristic to a corresponding value in the matching data of the domain-specific database; and
      calculating any variation between the corresponding value of the characteristic and the value of the matching data;
   creating a searchable index of the matching data and corresponding variations;
   receiving a request for a monetary value corresponding to a variation responsive to a search of the searchable index, the search including a characteristic from the set of characteristics and corresponding variation; and
   submitting a query to a data source, the query including the characteristics and the corresponding variation, wherein the domain-specific database is linked to the data source through an index of domain-specific data and an identifier of the object;
   wherein the monetary value reflects one of an increase in value of the object and a decrease in value of the object based on a type and degree of the variation.

14. The computer program product of claim 13, wherein the domain-specific database is a product specification database, and the object is a product created by a manufacturer.

15. The computer program product of claim 13, wherein the identification of the object is determined using an image detection technique.

16. The computer program product of claim 13, wherein the object is a building structure, the program instructions are further executable to implement:
   receiving a request for compliance data corresponding to a variation responsive to a search of the searchable index, the search including a characteristic from the set of characteristic and corresponding variation; and
   submitting a query to a data source, the query including the characteristic and the corresponding variation, wherein the domain-specific database is linked to the data source through an index of domain-specific data and an identifier of the object, the data source storing building regulation codes;
   wherein the compliance data includes an indicator of compliance of the variation based on the building regulation codes.

17. The computer program product of claim 13, wherein the set of characteristics includes at least one of dimensions, colors, and conditioning.

* * * * *